March 1, 1960

M. J. SCHULTZ 2,926,726

BEAD-PROTECTING TIRE MOUNTING PLATE

Filed March 19, 1958

INVENTOR
MATTHEW J. SCHULTZ

Williamson, Schroeder, Adams & Meyers
ATTORNEYS

United States Patent Office 2,926,726
Patented Mar. 1, 1960

2,926,726
BEAD-PROTECTING TIRE MOUNTING PLATE

Matthew J. Schultz, Red Lake Falls, Minn., assignor to Steelman Products Corporation, Red Lake Falls, Minn., a corporation of Minnesota Application March 19, 1958, Serial No. 722,459

3 Claims. (Cl. 157—1)

This invention relates to tire tools and more specifically relates to an accessory for use in applying a tire onto a rim.

It has been found that the application of a tubeless tire of the type incorporating a blow-out-resistant safety shield onto a rim is rather difficult, without causing damage to the inner peripheral edge portion of the safety shield which wraps around the bead of the tire. Conventionally tires have been merely flexed over the peripheral edge of the rim, and this has been accomplished without any substantial damage to the bead of the tire. However, because the safety shield is constructed of soft and pliable rubber generally similar in nature to that of an inner tube, the peripheral edge of the safety shield, when being forced over the outwardly flared edge of a tire rim is frequently pinched and is subjected to possible tearing if the edge of the rim is at all rough or nicked. It has been found that the inner peripheral edge portion of the safety shield engages, as the tire bead is tautly stretched for movement over the rim flange, the surface of the flared edge portion of the rim flange which races radially inwardly of the wheel. It should be recalled that the rim flange of most modern conventional rims has the outer edge portion thereof flared outwardly and generally back upon itself. The safety shield which is soft and pliable must therefore move outwardly from the rim flange in a direction parallel to the wheel axis and then around the outwardly flared edge portion of the rim flange in order to ultimately reach a position inwardly of the rim flange. It will therefore be seen that if there is any roughness whatsoever on the rim flange, the safety shield is subjected to very substantial wear and likelihood of being torn.

An object of my invention is the provision of a new and improved accessory of simple and inexpensive construction and operation for use in mounting a tire on a rim.

Another object of my invention is the provision of a tire bead and safety shield protecting plate applicable to the rim of a wheel for guiding the tire bead and inner peripheral edge portions of the safety shield substantially in the plane of the marginal edge portion of the rim flange and then smoothly over the edge of the rim flange for seating properly in the rim.

A further object of my invention is the provision of an accessory for use with a wheel rim in mounting a tubeless tire and safety shield and to prevent substantial wearing of or damage to the inner peripheral portions of the safety shield.

These and other objects and advantages of my invention will more fully apear from the following description made in connection with the accompanying drawings wherein like reference characters refer to the same or similar parts throughout the several views and in which.

The accessory comprising the present invention includes a rigid and substantially flat plate 10 having a circular outer edge 11 and having an opening 12 in the center thereof concentric with the edge. Engaging means are provided on the bottom side of plate 10 for holding the plate in stationary position with respect to a wheel rim. The engaging means comprise a continuous circular ring or rod 13 affixed as by welding to the edge portion of the plate 10 but spaced slightly inwardly from the peripheral edge thereof.

Figure 1:
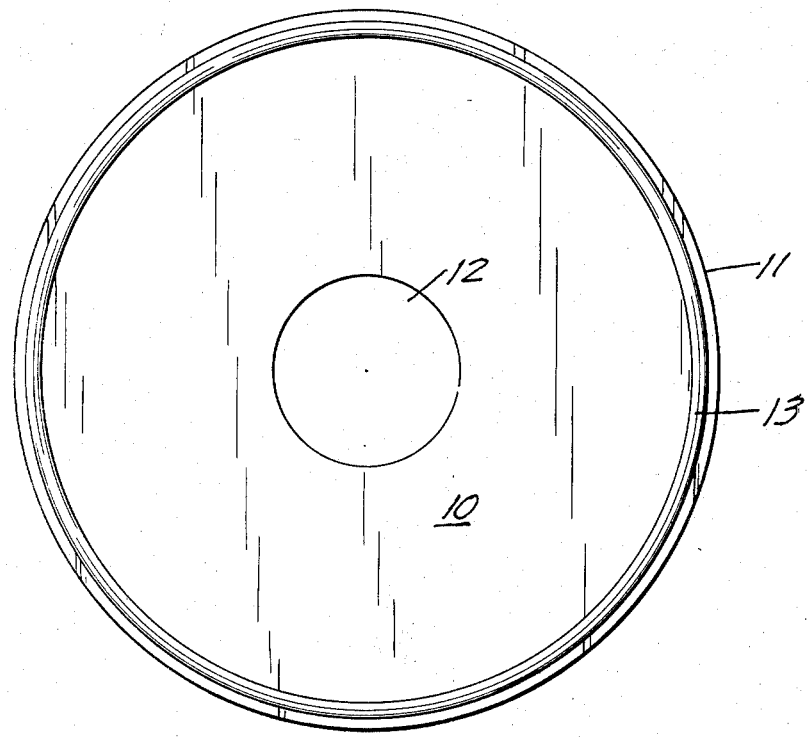
Fig. 1 is a bottom plane view of my invention.
Figure 2:
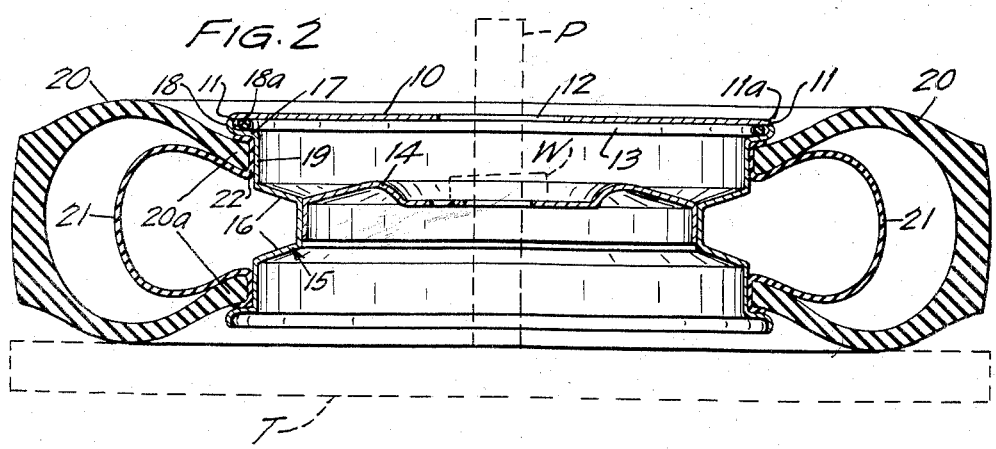
Fig. 2 is a section view of a wheel and rim and tubeless tire incorporating a blow-out-resistant safety shield being applied onto the rim and showing the use of my bead-protecting plate.

The outer edge 11 of the plate 10 is smoothly rounded, as best seen in Fig. 2 and at the numeral 11a. The smooth rounding of the peripheral edge facilitates ready and easy sliding of the tire bead thereover.

In understanding the invention, it is well to note the construction of a typical automobile wheel. Such a wheel has a central wheel disc 14, and an annular rim indicated in general by numeral 15 which defines a central channel 16, a rim flange 17 which has an outwardly flared peripheral or marginal edge portion 18. In modern construction, the flared edge portion 18 of the rim flange 17 is curved outwardly and back upon itself as clearly shown in Fig. 2. The rim 15 has a number of surfaces which face generally radially inwardly of the wheel and which are designated by the numerals 18a and 19. Whereas the surface 19 is generally cylindrical, the annular surface 18a is concavely shaped.

As best seen in Fig. 2, it will be noted that the external diameter of the plate 10 is slightly greater than the diameter of the marginal edge of the flange 17, and the external diameter of the ring 13 is slightly smaller than the diameter of the flange edge, and the rod or ring 13 has a diameter substantially equal to the depth of the flare of the edge portion 18 outwardly beyond the rim flange 17 so as to support the plate 10 substantially in the plane of the marginal edge of the rim flange 17.

The tire 20 shown in Fig. 2 is provided with a safety shield 21 which is generally the same shape as tire 20 and is constructed of a soft and pliable rubber, similar to the type of rubber employed in inner tubes, but the safety shield 21 may be slightly heavier or less pliable than inner tube rubber. However, the rubber in the safety shield 21 is very substantially more pliable than the stiff and thick rubber in the tire 20. It will be noted that the inner peripheral edge portions 22 of the safety shield 21 are wrapped around the bead 20a of the tire. The inner peripheral edge portions 22 of the safety shield are formed in this configuration when manufactured and will retain themselves in this relationship with the tire, even when the tire and shield are removed from the wheel rim.

In operation, the wheel will normally be applied onto a tire-mounting table shown in dotted lines in Fig. 2 and indicated by the letter T, which has an upstanding post P projecting from the table top. Suitable means such as a wedge W may be employed in connection with the post for maintaining the wheel in stationary condition on the table top. The tire and safety shield which are assembled are applied initially to the rim 15 in a conventional fashion, slipping the first bead of the tire down into the channel 16 and slipping the other side of the tire bead across the rim flange.

Before the second or upper tire bead is applied into the rim, the plate 10 is applied onto the wheel rim, and the peripheral edge of the plate 10 will overlie the outwardly flared portion 18 of the rim flange 17. The circular rod 13 will engage both the rim flange and the outwardly flared peripheral portion 18 thereof. Because the external diameter of the ring 13 is substantially the same size only slightly smaller than the diameter of the marginal edge of the rim flange, the ring 13 will snap into position and will hold the plate 10 in the position shown.

The upper tire bead will be slipped into the rim at one side thereof and the other side of the tire bead and safety shield will lie on the upper surface of the plate 10. The tire bead will be moved along the top surface of the plate 10 in a radially outward direction and the tire bead and inner peripheral portion of the safety shield 21 will slip smoothly around the outer periphery of the rim flange and into seated position in the rim. The movement of the tire bead radially outwardly along the plate 10 may be accomplished by means of roller-type tire mounting tool, but even with such tools the tire bead and inner peripheral portion of the safety shield will slide smoothly around the outer marginal edge of the plate 10 and the outer periphery of the rim flange 17. It will be noted that because the tire bead and inner peripheral portion of the safety shield are moved along the smooth outer surface of the plate 10, there is substantially no wearing on the safety shield, nor is there any material tendency for the shield to be torn.

It should be understood that the present invention is also applicable to use in applying regular tubeless tires to the wheel so as to prevent damage to the wheel-engaging surfaces of the tire bead. It is believed well to note here that in modern tire construction the surface portion of the bead is of a substantially softer rubber than the remainder of the tire and therefore it is necessary that the bead be carefully handled when the tire is being applied to the wheel.

It will also be understood that the present invention is applicable to all types of modern wheels and specifically the safety wheels which require that the tire be removed from one side of the wheel. Such safety wheels have the central channel 16 displayed closer to one side of the wheel than to the other side.

It will be seen that I have provided a new and improved accessory particularly adapted for use with a tubeless tire employing a blow-out safety shield, in mounting the tire and shield onto a rim so as to protect the tire bead and the inner peripheral portions of the safety shield as the same are forced over the outer periphery of the rim flange.

It will, of course, be understood that various changes may be made in the form, detail, arrangement and proportion of the parts without departing from the scope of my invention which consists of the matter described herein and set forth in the appended claims.

What I claim is:

1. An accessory for use in mounting a tire on a rim having a rim flanged with a flared outer edge, said accessory comprising a substantially flat rigid plate having a substantially circular outer edge similar in diameter to the edge of the rim flange and adapted to overlie the edge of the rim flange when a tire is being applied onto the rim, a plate-positioning ring affixed on the bottom side of the plate and extending in radially inwardly spaced relation to the periphery thereof adjacent the circular outer edge, said ring having a thickness substantially equal to the depth of the flare on the rim flange to engage the rim flange and the flared edge thereof to hold the plate from moving transversely of the wheel axis and to hold the plate substantially in the plane of the flared rim edge, whereby to guide the bead of the tire substantially in the plane of the rim edge so as to cause the tire bead to pass smoothly over the edge of the rim flange.

2. The invention set forth in claim 1 wherein the edge of the plate is smoothly rounded to prevent tearing and cutting of the tire bead.

3. The invention set forth in claim 1 wherein said ring is continuous, whereby to support the entire periphery of the plate.

References Cited in the file of this patent

UNITED STATES PATENTS

| | | |
|---|---|---|
| 1,437,085 | Banta | Nov. 28, 1922 |
| 2,853,344 | Stout | Sept. 23, 1958 |